Dec. 9, 1969 P. S. CROSBY 3,483,488

BALANCED MODULATOR-DEMODULATOR CIRCUIT WITH NEGATIVE FEEDBACK IN SWITCHING ELEMENT

Filed Oct. 12, 1967

PHILIP S. CROSBY
*INVENTOR*

*BY*

*BUCKHORN, BLORE, KLARQUIST & SPARKMAN*
*ATTORNEYS*

United States Patent Office 3,483,488

Patented Dec. 9, 1969

3,483,488

BALANCED MODULATOR-DEMODULATOR CIRCUIT WITH NEGATIVE FEEDBACK IN SWITCHING ELEMENT

Philip S. Crosby, Portland, Oreg., assignor to Tektronix, Inc., Beaverton, Oreg., a corporation of Oregon Filed Oct. 12, 1967, Ser. No. 674,894
Int. Cl. H03c *1/54*
U.S. Cl. 332—43 11 Claims

ABSTRACT OF THE DISCLOSURE

A balanced modulator, or synchronous demodulator, includes a transformer having an input signal applied to the primary thereof, with the secondary being center-tapped and connected to a first output terminal. A pair of transistors have their collector-emitter paths respectively coupled between ends of the transformer secondary and a remaining output terminal, these transistors operating substantially as switches to connect the second output terminal alternately to first and second ends of the secondary. The transistors are able to operate substantially as switches because of a high degree of negative feedback provided by means of a diode circuit connected between the collector and base electrodes of each of the aforementioned transistors, so that, during conduction, the collector-emitter paths thereof establish a very low impedance secondary return. A differential amplifier drives the aforementioned transistors whereby the transistors are alternately driven to conduction and nonconduction in response to a reference signal applied to the differential amplifier.

BACKGROUND OF THE INVENTION

A balanced modulator or synchronous demodulator circuit is suitably employed for producing a sideband signal without the transmission of a carrier, or such a circuit may be employed for the demodulation of a similar signal. The demodulator function will be primarily discussed herein, but it is understood that the circuitry discussed can also be utilized to accomplish the reverse action.

Some modulator or demodulator circuits receive an input signal on an input control element, such as the grid of a vacuum tube or the base electrode of a transistor, whereby an output signal is produced which is very much affected by the transfer characteristic of the amplifying device. As a result, circuit operation may be undesirably nonlinear and the circuit may be difficult to balance. It is also possible to provide circuitry less affected by transfer characteristics, because of saturation effects. For example, an input signal to be demodulated can be applied to the collector-emitter path of a transistor, with the transistor then being driven alternately to saturation and nonconduction by means of a local reference signal. However, since the amplifying device is driven to saturation, such a circuit has definite frequency limitations.

Demodulation or the like can also be accomplished employing switching means adapted for high frequency operation, such as, for example, a narrow pulse demodulator apparatus or sampling circuit. However, this type of circuitry tends to be expensive, and moreover, can be subject to certain inaccuracies depending on relative phase of the input waveform at which sampling takes place. It would therefore be of advantage to provide a relatively uncomplicated demodulator or modulator circuit operable at higher frequencies, for example, up to approximately ten megahertz, and which does not introduce appreciable distortion.

SUMMARY OF THE INVENTION

In accordance with the present invention, a modulator-demodulator circuit employs a pair of control devices for coupling an input waveform respectively in a first polarity sense and a second polarity sense to output terminal means in accordance with a reference drive applied to such control devices. Each control device is provided with a high degree of negative feedback whereby a low output impedance is produced in the control device's output circuit when such control device is caused to conduct. It is through this low impedance that the input signal is coupled to the modulator-demodulator circuit's output terminal means. Because of this low impedance, the control devices operate substantially as switches, alternately connecting the input signal to the output terminals in accordance with a modulating or demodulating reference. The control devices are not driven to saturation in order to procure the low output impedance, but rather the low output impedance results from the aforementioned high degree of feedback present. Therefore, the circuit is suitable for higher frequency operation.

In accordance with a particular embodiment of the present invention, the control devices comprise transistors connecting either end of an input transformer secondary to a modulator-demodulator circuit output terminal through the respective collector-emitter paths of such transistors. The negative feedback circuit for each transistor comprises a pair of diodes in series between the transistor's collector and base, with such diodes being oppositely poled relative to one another in the series connection. The midpoint therebetween is coupled to a source of current, and the diodes are poled in a direction so as to pass current to a transistor when the transistor is caused to conduct. When a transistor is conducting, current will flow through one diode to the transistor's collector subtracting from current that would flow through the other diode to the transistor's base. As a result, when the transistor is conducting, a high degree of negative shunt feedback is present, and the collector-to-emitter circuit appears to be a low resistance for coupling a segment of the signal to output terminal means. During the following half-cycle of the local reference signal, the same transistor is nonconducting and substantially disconnected, and a second transistor couples the input signal in reverse phase to the circuit's output terminals.

In accordance with a preferred embodiment, a pair of such control devices, comprising a pair of transistors, are driven by a differential amplifier having a relatively high impedance connected in series with such differential amplifier's common terminal. This impedance determines the output level of the differential amplifier to such a degree that severe clipping takes place, and a substantially square wave is applied to the aforementioned control devices. The transistors forming the aforementioned control devices either heavily conduct so as to provide a very low resistance path between input and output terminals, or else such transistors are substantially completely disconnected.

It is an object of the present invention to provide an improved modulator-demodulator circuit which is operable to provide substantially undistorted output at high frequencies, up to ten megahertz.

It is another object of the present invention to provide an improved modulator-demodulator circuit which is substantially independent in its operation from component transfer characteristics, supply voltages, and the like.

It is a further object of the present invention to provide an improved modulator-demodulator circuit which functions as a switch for alternately providing first and second low impedance paths for an input signal, and which is adapted to provide a single-ended output in the case of a demodulator, or a single ended modulation input in the case of a modulator.

It is another object of the present invention to provide an improved modulator-demodulator circuit having enhanced transient response.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
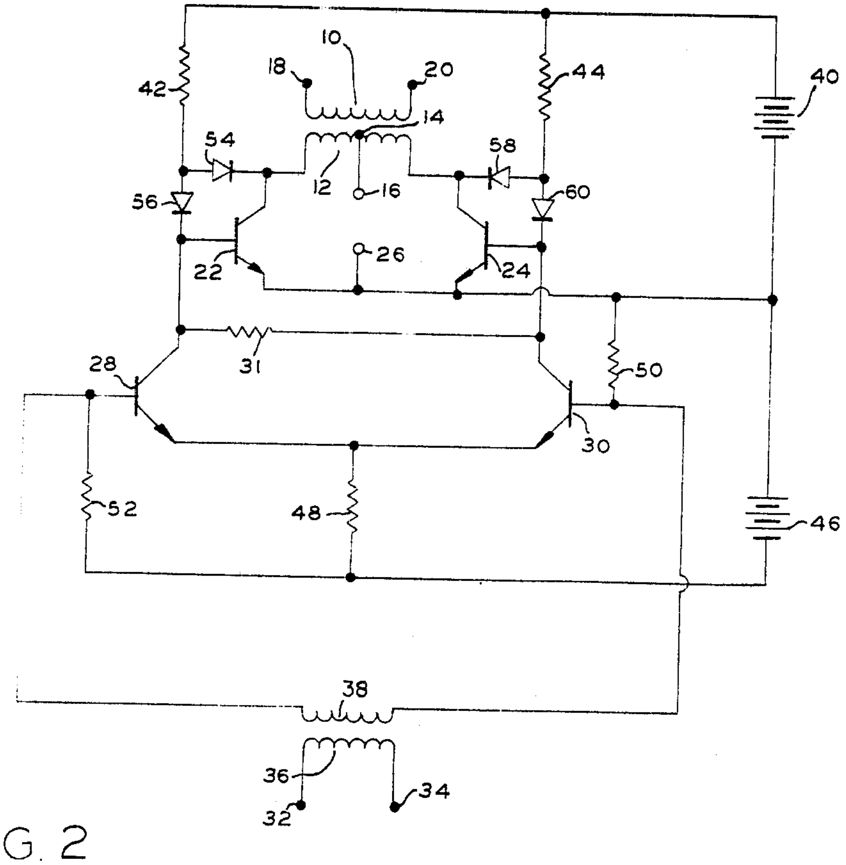
FIG. 1 is a schematic diagram of an embodiment of the present invention.

Referring to FIG. 1, illustrating an embodiment of a circuit according to the present invention, an input transformer includes a primary winding 10 and a balanced secondary winding 12 provided with a center tap 14 connected to the circuit's first output terminal 16. The primary winding 10 is connected between input terminals 18 and 20 which suitably receive an input signal for demodulation. The circuit further includes a pair of differentially connected control devices, in this embodiment comprising NPN transistors 22 and 24, having their output circuits, e.g. their collector-emitter paths, disposed between either end of secondary winding 12 and a second circuit output terminal 26, wherein terminals 26 and 16 provide the circuit's output terminal means. In particular, the collector terminal of transistor 22 is connected to one end of secondary winding 12, while the same transistor's emitter terminal is connected to output terminal 26. Similarly the collector terminal of transistor 24 is connected to the remaining end of secondary winding 12, while the emitter terminal of transistor 24 is also connected to output terminal 26.

The differentially connected transistors 22 and 24 are driven by a differential amplifier including a pair of amplifying devices, here comprising NPN transistors 28 and 30, having their common reference terminals or emitter terminals connected together and having their collector terminals intercoupled through resistor 31. The collector of transistor 28 is connected in driving relation to the control or base terminal of transistor 22, while the collector of transistor 30 is similarly connected in driving relation to the control or base terminal of transistor 24.

The differential amplifier, comprising transistors 28 and 30, receives a local reference signal which may, for example, be synchronized with the carrier of the input signal applied between terminals 18 and 20. This reference signal is applied between terminals 32 and 34 connected respectively to either end of a transformer primary winding 36. Terminals of the secondary winding 38 of the same transformer are connected respectively to the base electrodes of the differential amplifier transistors 28 and 30 whereby the transistors 28 and 30 are driven by such local reference signal, and in turn drive the control terminals, i.e. the base terminals, of transistors 22 and 24 in an opposite polarity sense, that is, in phase opposition.

A first source of current for the FIG. 1 circuit is here illustrated as a battery 40 having its negative terminal connected to the emitters of transistors 22 and 24 as well as to output terminal 26, and having its positive terminal connected in common to first end terminals of a pair of load impedances comprising resistors 42 and 44. A second source of current for the FIG. 1 circuit here comprises a battery 46 having its positive terminal connected to the negative terminal of battery 40, and having its negative terminal coupled through a relatively high impedance in the form of resistance 48 to commonly connected emitters of transistors 28 and 30. The resistance of resistor 48 is arranged to be relatively large in comparison with the emitter resistance of either transistor 28 or transistor 30, whereby the value of curernt conducted through the collector-emitter paths of these transistors is principally determined by the value of resistor 48. A resistor 50 is interposed between the common connection of batteries 40 and 46 and the base of transistor 30, while a resistor 52 connects the base of transistor 28 to the negative terminal of battery 46. Resistors 50 and 52 are seen to be disposed in series across battery 46, with the secondary 38 serially interposed between resistors 50 and 52. This circuit establishes correct D.C. operating levels for the bases of transistors 28 and 30 and enhances common mode rejection without requiring a center tap on secondary winding 38.

Each of the transistors 22 and 24 is provided with a high degree of negative feedback. For example, a first feedback circuit comprising diodes 54 and 56 is interposed between the collector and base of transistor 22, while the remaining terminal of load resistor 42 is connected to the junction between these diodes. Similarly, a second feedback circuit comprises diodes 58 and 60 serially interposed between the collector and base of transistor 24, with the juncture therebetween being connected to the remaining terminal of load resistor 44. In the case of each feedback circuit, the diodes are reversely poled with respect to one another. For the NPN transistors as shown, the cathode of diode 54 is connected to the collector of transistor 22, while the cathode of diode 56 is connected to the base of transistor 22. Similarly, the cathode of diode 58 is connected to the collector of transistor 24 while the cathode of diode 60 is connected to the base of transistor 24. For PNP transistors, the diode polarities would be reversed.

Referring to the operation of the FIG. 1 circuit, an input signal which is to be demodulated is supplied between terminals 18 and 20, while a local reference signal is applied between terminals 32 and 34. The local reference signal is of such amplitude that, for almost a full half-cycle of such reference signal, transistor 28 will conduct and transistor 30 will be nonconducting. The reverse will be true in the next following half-cycle. As hereinbefore indicated, the resistance of resistor 48 is large as compared with the emitter resistances of transistors 28 and 30, and the current in resistor 48 is mostly determined by the resistance of resistor 48, as well as by the voltage of battery 46 and the values of resistors 50 and 52. This assumes the peak A.C. voltage at the emitters of transistors 28 and 30 is small as compared to the D.C. voltage across resistor 48. Transistors 28 and 30 are not driven to saturation, but as such transistors are alternately driven into conduction and nonconduction by the large reference signal, drastic clipping occurs, since resistor 48 principally determines transistor current during conduction. The reference input signal supplied is larger than the range of linear swing of transistors 28 and 30 in this circuit, and therefore a substantially square wave is applied at the bases of transistors 22 and 24. The duration of positive and negative portions of this square wave are thus principally determined according to the polarity of the reference signal applied between terminals 32–34.

Load resistors 42 and 44 are of such a value as to insure that when transistor 28 is conducting, transistor 22 is off, and transistor 24 is conducting. Similarly, when transistor 30 is conducting, transistor 24 is off, and transistor 22 is conducting. That is, when transistor 28 conducts through resistor 42 and diode 56, the voltage drop across resistor 42 and diode 56 places the base of transistor 22 at a level below cutoff for transistor 22. However, during the next half-cycle of the reference signal applied between terminals 32 and 34, transistor 28 draws substantially no current through resistor 42 and diode 56, allowing the voltage at the base of transistor 22 to rise, causing conduction in transistor 22. The reverse operation, of course, takes place in the circuit comprising transistors 30 and 24. It is noted that the resistors 42 and 44 provide load impedances for transistors 28 and 30, as well as for transistors 22 and 24. Resistor 31 is employed to limit the drive to transistors 22 and 24 so as to avoid excessive voltage excursion on the bases of transistors 22 and 24 as might tend to limit the frequency of operation of the circuit as a result of the charging and discharging of circuit capacitances. Furthermore, resistor 31 provides appropriate bias for the respective diodes 56 and 60 when, for example, one or the other of transistors 28 and 30 is in a nonconducting state.

When transistor 22 conducts, its collector current provided from battery 40 through resistor 42 will flow through diode 54 subtracting from the current that may flow to the base of transistor 22 through diode 56. If the voltage across the collector-emitter path of transistor 22 tends to increase because of an increase in current therethrough from secondary 12, the current through diode 54 decreases, and the current through diode 56 increases so as to cause an increase in conduction through the emitter-collector path of transistor 22. Similarly, if the voltage across the collector-emitter path of transistor 22 tends to decrease, the current through diode 54 increases causing the current to diode 56 to decrease. The latter change would tend to decrease conduction through the collector-emitter path of the transistor. Thus, when transistor 22 is conducting, a high degree of A.C. shunt negative feedback exists, and the collector-to-emitter circuit appears to be of very low A.C. impedance.

During a first given half-cycle of the reference signal wavefrom as applied to terminals 32–34 and therefore while the reference signal waveform has a first polarity sense during which time transistor 22 is caused to conduct, the input signal applied to terminals 18–20 will appear at output terminals 16–26 in a first polarity sense which we shall call "normal" phase. Thus, the current in primary winding 10 will induce a voltage in winding 12, and resulting current will be conducted, e.g. from terminal 16, through the left side of winding 12, and through the very low impedance of the emitter-collector output circuit of transistor 22 to terminal 26. During the next, or second, half-cycle of the reference signal waveform, i.e. when the polarity sense thereof reverses, current in primary winding 10 will induce the voltage in winding 12, and the resulting current will be conducted, e.g., from terminal 16, through the right side of winding 12, and through the very low impedance emitter-collector output circuit of transistor 24 to terminal 26. Therefore the input signal applied to terminals 18–20 will now appear at output terminals 16–26 in a second polarity sense or in "reverse" phase. During this second half-cycle, the transistor 22 will be rendered substantially nonconducting because of the cutoff voltage applied to its base and because of the disconnecting action of diodes 54 and 56. At such time, the voltage at the base of transistor 22 is substantially below emitter voltage level, and diode 54 is substantially reverse biased and therefore nonconducting. As will be understood, the same conditions obtain in the feedback circuit of transistor 24 during the next succeeding half-cycle of the reference waveform applied between terminals 32 and 34.

Figure 2:
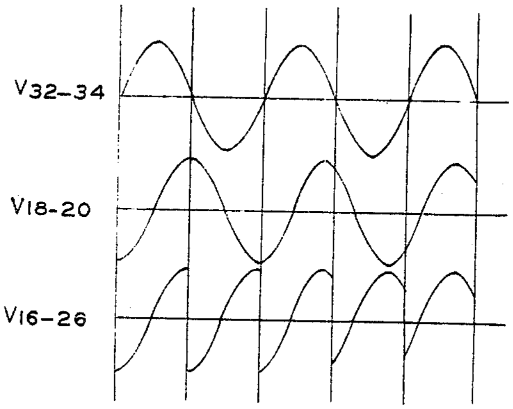
FIG. 2 is a waveform chart illustrating typical operation of the FIG. 1 circuit.

The waveform chart of FIG. 2 is illustrative of the operation of the FIG. 1 circuit wherein the reference signal waveform is designated $V_{32-34}$, the input waveform is designated $V_{18-20}$, and the output waveform is designated $V_{16-26}$. This waveform chart assumes a reference signal, $V_{32-34}$ which is, in this case, similar in frequency to but not equal in frequency to the input waveform $V_{18-20}$. The circuit operates such that a current proportional to the input waveform, $V_{18-20}$, is recovered at the output substantially in its entirety except for the sign thereof. The sign thereof is reversed in accordance with reversals in the sign of the reference signal $V_{32-34}$.

The coupling of the input waveform from the input terminals to the output terminals is substantially linear and is not affected by the transfer characteristics of the transistors. Rather, transistors 22 and 24 operate substantially as switches for alternately connecting terminal 26 to alternate ends of winding 12 in a polarity sense dictated by the reference signal, this reference signal producing, by way of the differential amplifier comprising transistors 28 and 30, the control input applied to the control or base terminals of transistors 22 and 24. Transistors 22 and 24 either heavily conduct and provide essentially a very low resistance or direct path between circuit input and output terminals, or else such transistors are completely disconnected. It is possible to drive a low impedance load from terminals 16 and 26 because of the low impedance coupling of the input signal to such output terminals, essentially by switching action.

A similar circuit can be implemented for low frequency operation by providing resistance coupling between the collector electrodes of transistors 28 and 30 and the repective base electrodes of transistors 22 and 24, with the feedback circuitry as well as resistors 42 and 44 being eliminated. In such a circuit, transistors 22 and 24 would advantageously be allowed to saturate to thereby provide a low collector-emitter impedance path for coupling the input signal to the output terminals without deleterious effects caused by transistor transfer characteristics. However, such an arrangement employing saturation is restricted to operation at low frequencies at which alternate saturation and unsaturation of transistors 22 and 24 can take place. According to the present invention saturation does not take place in transistors 22 and 24, for instance, but rather the low collector-emitter impedance for linearly coupling the input signal to the output terminals is procured through the high degree of negative feedback provided by the feedback circuitry including, for example, diodes 54, 56, 58, and 60. The circuit according to the present invention has been found to be very effective at frequencies up to ten megahertz.

Among other advantages of the present invention, as employed as a demodulator or more explicitly as a synchronous demodulator, is the provision of a single-ended output at terminals 16–26, which greatly simplifies the circuitry coupled to the output terminals. Moreover, sampling of the input signal takes place once for each half-cycle of the reference signal and then for substantially the entire halfcycle which provides more accurate reproduction, for example, of rapid changes of components in quadrature with a reference signal than would be the case with demodulators that sample once each cycle or at some other interval. Furthermore, the carrier frequency is inherently suppressed, simplifying filtration of the output signal. As previously stated, the transfer characteristic of the circuit is relatively independent of the characteristics of the transistors employed, and is also relatively independent of the characteristics of the feedback diodes as well as circuit voltages. Balancing of the circuit is easily accomplished in a routine manner as understood by those skilled in the art.

Although the circuit has been hereinbefore principally described as a demodulator, the same circuit may be used as a balanced modulator, wherein the carrier is applied to terminals 32–34. The modulating signal is applied at terminals 16–26, and the output is provided at terminals 18–20. As a modulator, the circuit has the advantage of a high degree of carrier suppression, single ended modulating current input which simplifies modulator design and linearity that is relatively independent of the transistors and diodes as well as supply voltages. Also, the output current is affected almost immediately by the modulating current, thus providing extremely good transient response. The circuitry according to the present invention is useful in a number of applications, for example, in equipment for a single sideband transmission and reception as well as for TV color subcarrier demodulation and the like.

While I have shown and described a preferred embodiment of my invention, it will be apparent to those skilled in the art that many changes and modifications may be made without departing from my invention in its broader aspects.

I claim:

1. A balanced modulator-demodulator circuit for receiving an input waveform and providing a modulated or demodulated output at output terminal means thereof, said circuit comprising:

a first control device having a control terminal and having an output circuit for effecting coupling of said input waveform to said output terminal means in a first polarity sense in response to a control input applied in a first polarity sense to the control terminal of said first control device, a second control device having a control terminal and having an output circuit for effecting coupling of said input waveform to said output terminal means in a second polarity sense in response to a control input applied in a second polarity sense to said control terminal of said second control device, feedback means coupled between the output circuit and the control terminal of each of said control devices for providing a high degree of negative feedback and a low value of output impedance when each such control device causes coupling of said input waveform to said output terminal means, and means for applying a common reference signal in opposite polarity sense to said control terminals of said control devices.

2. The circuit according to claim 1 wherein said means for applying a common reference signal in an opposite polarity sense to said control terminals of said control devices comprises a differential amplifier including a pair of amplifying devices each respectively providing the drive for a said control terminal of a said control device, said amplifying devices of said differential amplifier having common reference terminals that are coupled together, and means for providing current to said common reference terminals including a current supplying impedance which is high in value in comparison to the common reference terminal impedance of each said control devices so that the output current of each said amplifying device is principally determined by such current supplying impedance.

3. The circuit according to claim 1 wherein each said control device comprises a transistor and wherein said output circuit comprises the collector-emitter path of said transistor, the control terminal comprising the base terminal of said transistor.

4. The circuit according to claim 3 wherein said feedback means includes a pair of diodes connected in series in an opposite polarity sense with respect to one another between the base terminal of a said transistor and the collector terminal thereof, and means for supplying current to the connection between said diodes, said diodes being poled and said current being supplied in a direction for coupling such current to said collector terminal as said transistor is caused to conduct by the control input thereof.

5. A balanced modular circuit for receiving an input waveform and providing a modulated or demodulated output between output terminals thereof, said circuit comprising:

a transformer having a primary and having a balanced secondary including a center connection to which a first said output terminal is connected, a pair of non-saturating control devices interposed between said secondary on either side of said center connection and the remaining output terminal, each of said control devices having a control terminal for determining the conduction state of such control device between said secondary and said remaining output terminal, and a differential amplifier receiving a reference signal and having a differential output coupled to the control terminals of said control devices to cause said control devices to conduct and non-conduct alternately in accordance with the values of the reference signal, each of said control devices having a feedback means coupled between an output terminal thereof and the control terminal thereof for providing a high degree of negative feedback and a low value of output impedance when such control device is conducting.

6. The circuit according to claim 5 where each of said control devices comprises a control transistor having its collector connected to said secondary on one side of the center connection thereof, and having its emitter terminal connected to said remaining output terminal, said control terminal comprising the base of said control transistor, said feedback means comprising a pair of diodes connected in series in an opposite polarity sense with respect to one another between the base and the collector of each said control transistor, a source of current for each said control transistor and a series impedance connected between said source of current and the common terminal between said diodes for supplying current to said control transistor, said diodes being poled to conduct such current when said control transistor conducts, and wherein said diodes cooperate to effectively disconnect said control transistor in the absence of drive from said differential amplifier such that said control transistor at that time does not conduct.

7. The circuit according to claim 6 wherein said differential amplifier comprises a pair of transistors the collector electrodes of which are connected to respective base terminals of said control transistors, means providing current in common to the emitters of the differential amplifier transistors, said means including a resistor having a resistance high in comparison with the emitter resistance of each differential amplifier transistor so as to provide at the base of each control transistor a severely clipped version of the signal applied to the bases of the differential amplifier transistors, said signal applied to the bases of the differential amplifier transistors comprising the said reference signal.

8. The circuit according to claim 6 wherein said differential amplifier comprises a pair of transistors and an input transformer having a secondary winding coupled between the bases of the transistors of said differential amplifier, the emitters of said differential amplifier transistors being coupled to a common reference point and the collectors thereof being connected to the bases of respective control transistors, such that a said series impedance, together with a base connected diode, provides the collector load impedance of a differential amplifier transistor.

9. The circuit according to claim 8 further including a second source of current connected in series with said first mentioned source of current, with said remaining output terminal being connected to the common terminal between the sources of current, a resistance coupling the remaining terminal of said second source of current to the emitters of said differential amplifier transistors, such resistance being high in comparison with the emitter resistance of said differential amplifier transistors, a first resistor connecting said remaining terminal of said second source of current to the base of a first of said differential amplifier transistors, and a second resistor connecting said remaining output terminal to the base of a second of said differential amplifier transistors.

10. The circuit according to claim 7 wherein all said transistors are of the NPN type, and wherein said diodes have their anode terminals connected in common to said impedance.

11. The circuit according to claim 8 further including a resistance intercoupling the collectors of said differential amplifier transistors.

References Cited

UNITED STATES PATENTS

| | | | |
|---|---|---|---|
| 3,245,006 | 4/1966 | Runyan. | |
| 3,305,796 | 2/1967 | Somer et al. | |
| 3,315,181 | 4/1967 | Rosenthal. | |
| 3,382,457 | 5/1968 | Conway | 332—14 X |

ALFRED L. BRODY, Primary Examiner

U.S. Cl. X.R.

128—5.4; 307—232, 241, 254; 328—134; 329—50, 103, 192; 332—44